United States Patent
Pietrobon

(10) Patent No.: US 6,206,955 B1
(45) Date of Patent: Mar. 27, 2001

(54) VACUUM CLEANER APPARATUS WITH AT LEAST THREE STAGES OF DUST COLLECTION, OF THE TYPE WITH A PATH PARTIALLY SUBMERGED IN WATER AND PROVIDED WITH A SEPARATION LABYRINTH

(75) Inventor: Silvano Pietrobon, Fonte (IT)

(73) Assignee: W.S. S.p.A., Fonte (IT)

( * ) Notice: Subject to any disclaimer, the term of this patent is extended or adjusted under 35 U.S.C. 154(b) by 0 days.

(21) Appl. No.: 09/297,232

(22) PCT Filed: Nov. 3, 1997

(86) PCT No.: PCT/IT97/00270

§ 371 Date: Apr. 26, 1999

§ 102(e) Date: Apr. 26, 1999

(87) PCT Pub. No.: WO98/19587

PCT Pub. Date: May 14, 1998

(30) Foreign Application Priority Data

Nov. 7, 1996 (IT) ................................. TV96A0141

(51) Int. Cl.$^7$ .................................................. B01D 47/02
(52) U.S. Cl. ............................... 96/310; 96/318; 96/345; 96/350; 96/354; 96/357; 96/364; 55/472; 55/473; 55/DIG. 3
(58) Field of Search ............................ 55/467, 472, 473, 55/486, 487, DIG. 3; 15/353; 96/302, 310, 318, 329, 330, 333, 337, 339–342, 345, 348–351, 354, 356–358, 364, 368, 371

(56) References Cited

U.S. PATENT DOCUMENTS

| | | | |
|---|---|---|---|
| 2,114,780 | * | 4/1938 | Juelson .................................. 96/339 |
| 4,218,805 | * | 8/1980 | Brazier ............................. 55/DIG. 3 |
| 4,547,206 | * | 10/1985 | Sovis et al. ............................. 55/255 |
| 4,640,697 | * | 2/1987 | Erickson, Jr. .......................... 96/333 |
| 4,726,825 | * | 2/1988 | Natale .............................. 55/DIG. 3 |
| 4,758,460 | * | 7/1988 | Spicer et al. ....................... 55/487 X |
| 5,096,475 | * | 3/1992 | Kasper et al. .......................... 96/333 |
| 5,199,963 | * | 4/1993 | Scarp ................................ 96/340 X |
| 5,268,010 | * | 12/1993 | Zengerer ................................ 96/330 |
| 5,925,171 | * | 7/1999 | Pietrobon .............................. 96/342 |
| 6,019,826 | * | 2/2000 | Pietrobon .............................. 96/333 |

FOREIGN PATENT DOCUMENTS

WO96/28082 * 9/1996 (WO) .
WO96/33003 * 10/1996 (WO) .

* cited by examiner

Primary Examiner—Robert H. Spitzer
(74) Attorney, Agent, or Firm—Harrison & Egbert

(57) ABSTRACT

An improved vacuum cleaner apparatus having at least three stages of dust collection with a path partially submerged in water and provided with a separation labyrinth. The apparatus is subdivided into two parts, an upper one which includes the support body of a suction motor unit, and a lower one which includes the labyrinth. The lower one provides an intermediate washable filter. The support body is housed in an opening coated by an acoustic insulating material.

8 Claims, 2 Drawing Sheets

VACUUM CLEANER APPARATUS WITH AT LEAST THREE STAGES OF DUST COLLECTION, OF THE TYPE WITH A PATH PARTIALLY SUBMERGED IN WATER AND PROVIDED WITH A SEPARATION LABYRINTH

This invention has for an object a vacuum cleaner apparatus with at least three stages of dust collection, of the type with an air siphon path partially submerged in water and provided with a separation labyrinth.

The innovation finds particular even if not exclusive application in the field of the electric appliances, with a high qualitative standard, also professional, intended for a thorough cleaning and at the same time for a hygienizing of the surfaces and of the air in the rooms.

TECHNICAL FIELD

The vacuum cleaner fittings belong to the state of the art for a long time. The traditional ones, are essentially made up of a body supported by small feet or pivoting wheels, on whose inside a motor unit is provided for the sucking of the external air, together with the dirt, for being filtered and again put in circulation. Such apparatus, by sucking the air through an extension or elephant trunk, held by the user, commonly allows, according to the need, the dusting of carpets, mats, door-mats, moquette, and similar surfaces, but more recently also of the same floor, by means of electric brooms. The air thus sucked, at first gets through at least one filter, which is generally made up of the same dust collection bag, for then being let in again once been filtered, as has already been disclosed, in the surrounding environment. Generally, the bag-filter is realized in a particular type of paper fabric with thick stitches, thus allowing the discharge of the sucked air, but retaining only the macrodust and the thicker dust in its inside.

In the described solutions different drawbacks are noticeable. Among these, it is mentioned that a careful cleaning of the treated surface does not seem possible, but above all, that the air still partially dirty, once sucked, is again let in the environment, transporting a large quantity of dust that for a certain time remains in suspension. This occurs because of the apparatus structure, which even if providing for the dust removal, cannot retain it completely in the traditional sachets-filter. This fact can also not be a particular worry for the healthy people, as they do not feel immediate benefits from a more careful cleaning, differently from the people who suffer of allergy. At this purpose, it is scientifically proved that the household or the work environment, may be particularly favourable to the rising of allergic symptoms, which mostly in the periods of maximum evolution, as for example when the heating is on, regularly occur. These symptoms are mainly originated from the volatility of the microdust and of the mites that form it, using it as their nourishment. People particularly sensitive to dust, have the need to repeat the cleaning treatment several times, by frequently replacing the filter, which is an operation that any way does not offer satisfactory results.

A recent solution, used to solve the problem, consisted in providing, as combined with a traditional vacuum cleaner, the use of a device also suitable for a simultaneous washing of the surfaces. More in particular, said apparatus consists always of a body, movable, to which a motor suction unit is associated, but in whose inside it is obtained a tank containing the water to be distributed on the surfaces to be treated. The air, together with the water previously dispersed by a delivering device applied on the elephant trunk, is subsequently sucked and thus let inside of said tank. Here, a kind of perpendicular fan placed in correspondence of the exit hole of the sucked air, by rotating, creates a hollow area that by avoiding the recirculation of the fine dust stirs both water and air at the same time. Thus it will be obtained a precipitation of water and dust thanks to its catalytic effect, discharging in the surrounding environment only the sucked air, partially cleaned from such residues.

The suggested solution has some drawbacks, which first of all consist of the fact that the afore mentioned apparatus cannot work exclusively as a vacuum cleaner. Secondly, when the surfaces are treated with liquids, they remain, even if just for a small period, rather damp, having their utility and functional range limited. The third but not the least aspect is that it would be a rather complex apparatus and that it does not allow to further optimize the filtering function of the sucked air.

In the Italian Patent application for industrial invention n.TV91A000117, a vacuum cleaner apparatus and relative filter is particularly described, in which it is provided a body for the support of a suction group, and a container, on whose inside is engaged, in contact with an amount of water previously let in and in proximity of the suction mouth, a filter, said filter being obtained from the manufacturing of vegetable and/or animal fibres. Also the Italian patent Application for industrial invention n.TV92A000005, It belongs to the prior art, consisting of an improvement to the previously mentioned patent, in which it is provided that inside of the container there is:

- a first filter, being made up of an air delivering means at least partially submerged into an amount of water contained in the underlying tank, said means being directly connected to the manifold for the suction of the air coming from outside;
- a second filter, being engaged on the upper part and in proximity of said means for the delivering of the sucked air, said filter being obtained from the manufacturing of vegetable and/or animal fibres;
- some water previously let in the underlying retaining tank, which submerges at least partially said delivering means.

One of the just described purposes of the invention is also to avoid some drawbacks occurred when using the previous fittings. More in particular, it was noticed that the main problems would merge on the type of filter, which, besides being hardly accessible, would be frequently clogged requiring a constant maintenance such to require its resetting at the end of each use. Consequently, during the cleaning operations there will progressively be a substantial reduction of the filtering power to the detriment of the benefits for which a certain type of apparatus was chosen, but above all making useless even the more traditional cleaning. Also another drawback is that such apparatus would not allow the collection of eventually dispersed liquids, being mainly limited to sucking only the air together with the fine dust in general. And in fact, the increase of the level of liquid inside of the container could interfere with the good functioning of the motor, which may thus be damaged and become very dangerous.

More recently, always the same applicant, has provided an improved vacuum cleaner apparatus of the type essentially divided in two parts, respectively; a first upper one that includes the body for the support of a suction motor unit placed into an opening coated by acoustic insulating material and buried into a first annularly positioned filter, and a lower one consisting of:

a water container, essentially cone-shaped, peripherally engaged to said body by lever hooking means,;

a cylindrical element without ends placed inside of said container supported along the edge and partially immersed into water, thus obtaining between the facing walls, perpendicular to the bottom, an annular interspace, thus making up a siphon, which is the forced path of the air and/or of the liquid sucked from outside through sucking means;

at least one holed disc for the dirt separation, serving as a base of the cylindrical element and submerged by the water provided in the container;

one or more filters also with differentiated density which are not in contact with the water, where one of them is supported by the cylindrical element, thus defining an intermediate air cushion.

In the just described solution, the mentioned drawbacks can be summarized in the excessive complexity of the structure, which derives from the presence of the many filters which are inside of the separation container, that would also reduce its suction effectiveness. Additionally, notwithstanding the presence of more intermediate filters, the drops of water would anyway tend to go back to the container up to impregnate the upperplaced filters, and dangerously, the area in which the suction electric group is placed. Consequently, a rather constant maintenance is required, which would regularly concern both said filters, by suitably drying them, and with respect to periodic controls of the motor housing.

A further evolution of the apparatus, even more recently realized, with the Italian application n.TV94A000052, has provided the substitution of the intermediate discs having a filter function for separating the air from the mixture of water and sucked dust by a removable deflector means. Said deflector is placed in an almost suspended position, above the tank which contains the water to be stirred (for the air washing) and it has a circular and funnel-like shape, peripherally supported by the cylindrical element inside of said water container. The simplification, has therefore concerned only the lower part of the vacuum cleaner, letting instead unchanged the upper part in which it is anyway provided a sponge filter, just above said deflector, and underlying the rotor filter. The drawback of this solution is found just in the presence of the sponge filter, which mainly when there is an excessive amount of water, tends to allow the upward migration of the water particles without stopping them. These latter therefore, after having impregnated the sponge filter, tend again to be called towards the rotor, impregnating its relative and next filter or -absolute filter-. The consequences are obvious. In the first place the emission of unpleasant smells, and therefore the need to carry out a constant maintenance of the first filter, which will have to be well washed by suitable detergents. Secondly a certain degree of danger, due to the fact that the water thus migrated could also concern some electric parts with inevitable problems.

The following national application n.TV94A000123, that represents again an evolution of the vacuum cleaner apparatus of the type having a path at least partially submerged in a water container, previously described, consisted in providing in addition to a first separation deflector-filter of the removable type, placed in an almost suspended position, above the tank containing the water to be stirred and having a funnel-like shape, peripherally supported by the cylindrical element inside of said water container; a second deflector being shaped like an overturned funnel with respect to the first one, placed above this latter, and associated to the microfilter engaged in correspondence of the suction rotor. The described solution, even without doubt presenting some improvements, does not yet allow a complete stop of the water particles that anyway tend to migrate upwards, that is towards the suction rotor. Secondly, the movement of the air thus sucked which is afterwards made to pass through the water siphon, determines a stirring which is still insufficient to eliminate all kinds of dirt completely, and which will consequently be let again into the surrounding environment.

The same applicant with the utility model n.TV95U000014, further improves the structure of the aforesaid vacuum cleaner. In more detail it includes, in addition to the previous one, a third separation deflector, having a substantially conic shape, coaxially and overturned placed with respect to a first funnel-like deflector which is in suspended position, above the tank containing the water to be stirred, peripherally supported by the cylindrical element internal to said water container, being supported by a tubular upright engaged with a corresponding male connection which is perpendicular to the container bottom.

All this considered, presently, the apparatus may be divided in two main zones provided for the air filtration. A first one, which consists of the water contained on the bottom of the main tank and with which the siphon path interacts. It in practice acts as a first filter, stopping in operative condition the macrodust, but not all of it, which deposits on the bottom of the tank, thus consequently requiring a discontinuous removal of the water there present, with a washing of the surface to then proceed to a filling with new water. A second filtration zone is made up of the microfilter, or absolute filter, placed on the upper part of the machine in proximity of the air circulation entry into the rotor. This latter would have the purpose of retaining all the residue dirt let through the first filtration stage (water), thus freeing clean air. Therefore the remaining particles, still present is a great amount, include both the small and the average size ones. Not only, but it sometimes occurs that a certain amount of macrodirt which is not collected during the passing in water, is able to go beyond the first obstacle proceeding toward the next filtration stage. The problem which can be noticed, is referred only to this latter stage, which just and for effect of the characteristics of the residual dust coming from the first stage, tends with excessive frequency to cause the clogging of the microfilter or absolute filter, obliging the house-keeper to a prompt intervention for the substitution of the same, by stopping the apparatus and removing the filter. Very often, finally, the microfilter is not replaced, making partly ineffective a primary function of the apparatus, namely that of holding the microdust mites included, preventing to free in the surrounding environment only clean air. These features are disclosed even in WO9628082 WS SPA PIETROBON. WO9633003 A (DONALDSON CO INC) discloses an air filtration arrangement for collecting particulate material from gas stream having a cylindrical box enclosing a stratified cylindrical filter. U.S. Pat. No. 4,547,206 (SOVIS JOHN F ET AL) discloses a vacuum cleaner including a bypass type blower motor encased in an upper part and associated with a water filter container encased in a lower part of the vacuum cleaner, in which a funnel shaped means with perforated wall is provided, said funnel shaped means having its bottom in close connection with the water level and wherein said perforated wall allows air passing to reach the suction motor placed on the upper part of the vacuum cleaner.

This solution is simple but water can be sucked across said funnel shaped means, so moist air can be recirculated in the environment. The purpose of this invention is also that to avoid the above-mentioned drawbacks and in particular to recirculate dust and moist air as stated above.

SUMMARY OF THE INVENTION

This and other purposes are reached with this innovation. In particular a vacuum cleaner apparatus is provided with at least three stages of dust collection, of the type with a path partially submerged in water and provided with a separation labyrinth, essentially divided in two parts, respectively: a first upper one that includes the support body of a suction motor unit with relative circuits, housed in an opening coated by acoustic insulating material, and a lower one that, including said labyrinth, comprises:

- a water container, peripherally engaged by hooking means, to said upperly placed body;
- a cylindrical element opened at the bottom and internal to said container, held up along the edge, partially immersed into water, obtaining between the facing walls, perpendicular to the bottom, an annular interspace, that makes up a siphon, as a forced path of the air and/or the liquid sucked from the outside through sucking means;
- at least one surface that filters the thick dust, interacting with the water in which it is immersed, some openings being made on the base of the cylindrical element;
- a first removable deflector, placed in an almost suspended position, above the water containing tank and having an upsidedown funnel-like shape, held up peripherally by the cylindrical element internal to said water container;
- a second funnel-like deflector overturned in respect to the first deflector, and placed above the first and underlying to a microfilter or absolute-filter engaged in correspondence of the suction rotor;
- at least one third separation deflector, having a substantially conic shape, coaxially placed and overturned with respect to said first one, being supported by a tubular upright engaged with a corresponding perpendicular male connection to the bottom of the container; and in which an intermediate filter is provided, of the type obtained in Filtren type sponge and the like, washable, annularly associated with respect to said microfilter or absolute filter and held up by a support common means in proximity of the entry channel to the rotor's mouth.

In this way, through the considerable creative contribution whose effect is an immediate technical progress, an ideal cleaning cycle of the air sucked by the apparatus is completed, optimizing the previously obtained advantages. In more detail, following the dirty air path, starting with the upstream suction, up to when the same clean air is let again in the environment, at least three distinguished areas or stages are obtained, intended for cleaning the same, each of which, progressively, tends to clean increasingly the sucked air, up to clean it completely. The first of these, as already noticed, occurs when the water contained in the container, where the outside airflow sucked, is forced to run along a siphon. This stage, proceeds substantially to the washing of the inlet air, making precipitate only the thickest dirt, allowing the air, only partly cleaned, to proceed toward a second filtration phase, intermediate, including a sponge filter or the like. In this case, the dirt retained is the one having a mean thickness, and which seems, in the totality, present in greater measure. This does not appear at all as a problem because the filter itself, like the filter-water, is easily removable for being subjected to a simple washing, and therefore being let in again. Additionally, it is found that one purpose of the intermediate air filtration stage, made up of the sponge, is also that of retaining the type of macrodust not eliminated by the passing in water, as the extremely volatile products (E.g. polystyrene, ashes, and so on).

Finally, the known third stage. This, placed at the end of the suction cycle and near to the rotor, allows the final cleaning of the air that transports the residual dirt, consisting of extremely small particles; from which the terminology used to identify it derives, microfilter or absolute filter.

A second, but not last advantage, relates to a less frequent need for ordinary maintenance, because, in this case the microfilter, not being often clogged by the excess of residual dust from the first stage, is not more subjected to a frequent substitution, with a comfort in use and an indubitable time and money saving.

These and other advantages will appear from the following specific description of a preferred solution with the aid of the schematic drawing enclosed whose details are not to be considered as limitative but only illustrative.

BRIEF DESCRIPTION OF THE DRAWINGS

Finally.

DETAILED DESCRIPTION OF THE INVENTION

Figure 1:
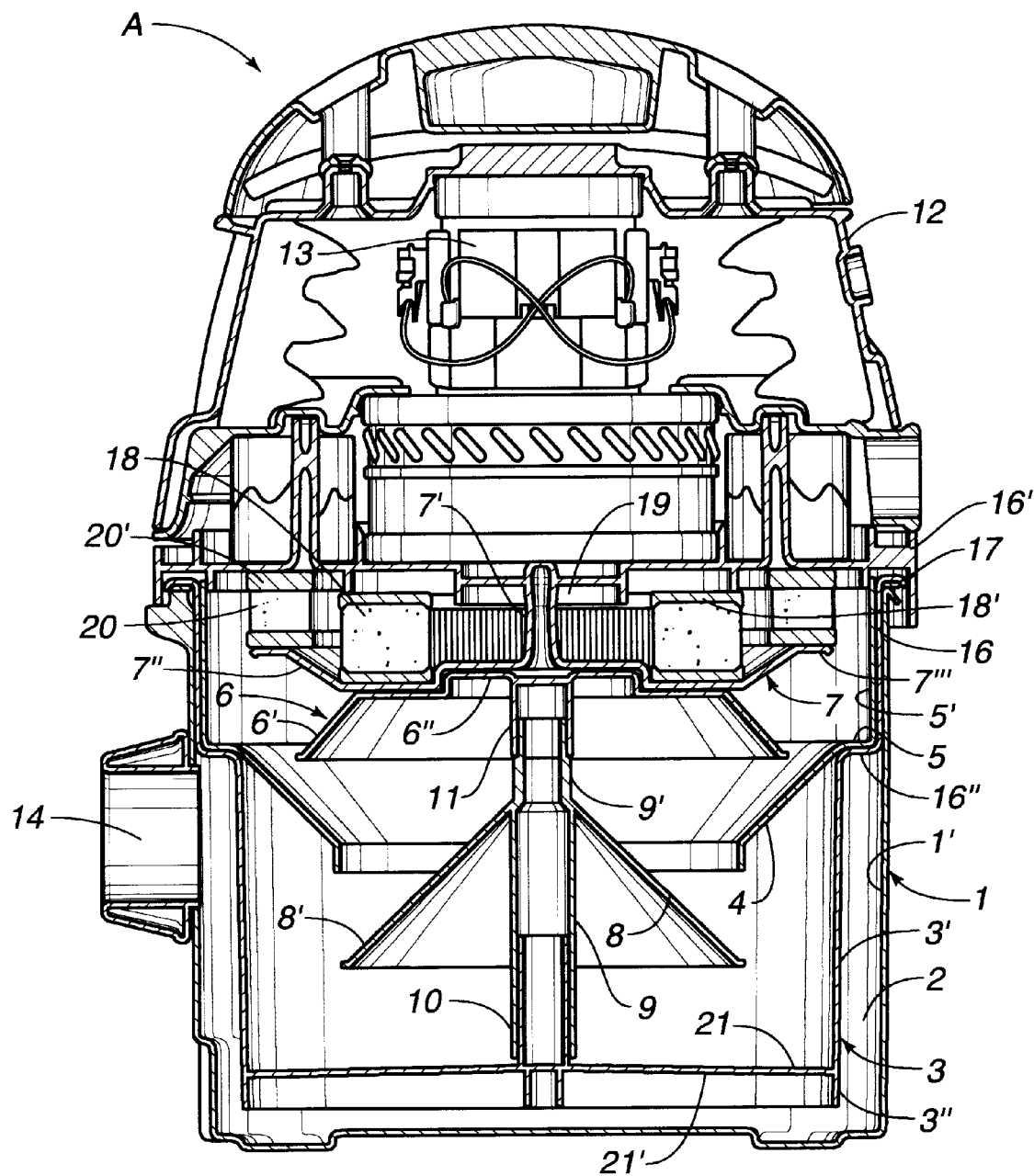
FIG. 1, shows a sectional view of the vacuum cleaner apparatus, concerning the three stages of progressive dust collection, and downwardly including a group of deflectors, as an interacting labyrinth for simplifying the separation of the air thus sucked, from the water which is inside of the washing chamber.
Figure 2:
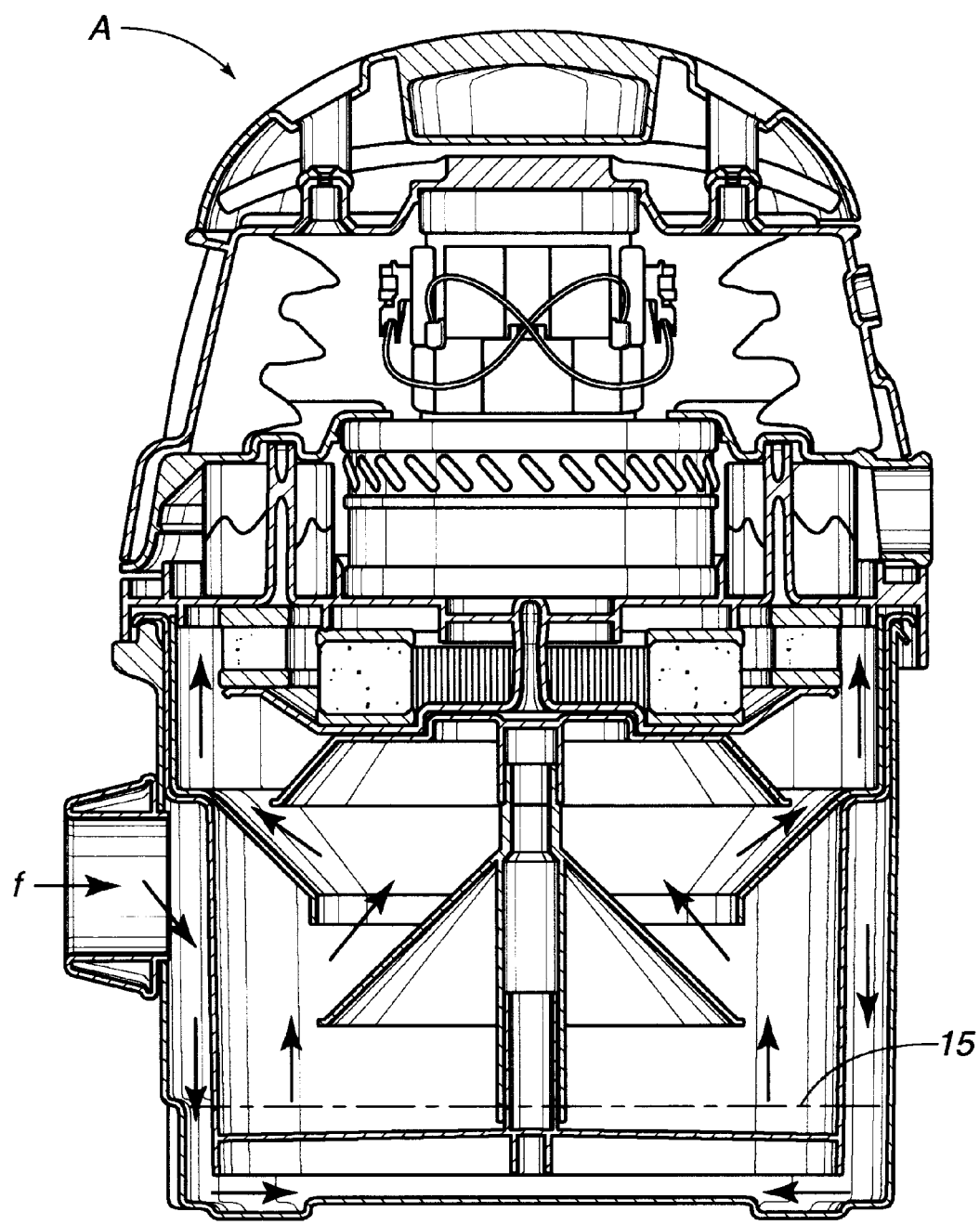
FIG. 2, is another section view of the vacuum cleaner apparatus of FIG. 1, in which the ideal path of an airflow sucked for then being let in again, cleaned, in the surrounding environment is shown.

Considering also the Figure as a reference, it can be noticed that an apparatus (A), particularly a vacuum cleaner having, at the same time an air cleaner function for the hygienizing of the environments, is essentially made up of two parts, respectively, a first one (12) including the support body of the suction group (13), and a second one, made up of an underlying water container (1), in whose inside it is provided at least one filter for cleaning the air, sucked by the mentioned apparatus (A) by means of a collection means or an external extension cord, for example, of the elephant trunk type.

In more detail, the suction group (13), creates a hollow, making convey inside of the apparatus (A) the air and/or the water mixed with dust previously removed and collected outside by the user by moving the above mentioned elephant trunk joined with a mouth (14) obtained on the side of the container (1).

On the inside of said container (1) a cylindrical structure (3), removable, is housed, whose walls (3') are maintained at a certain distance from the facing ones (1') which thus define the container (1). It is obtained, therefore, an annular interspace (2), in whose inside, following a forced path, the air and/or the water taken from outside flow by means of the suitable elephant trunk and are subsequently transferred toward the bottom of the container (1), partially filled with water (15). During the route, the airflow (f) let in the chamber determines the stirring of the water (15), undergoing a kind of washing, which allows the separation from the airflow (f), of the -macrodirt-, that consequently precipitates, laying time by time on the bottom of the container (1). The cylindrical structure (3), is held in suspension with respect to the container (1), providing on the upper part a collar (16), almost adherent to the internal wall (1') of the container (1), which protrudes with the end portion (16') over the upper edge of the container (1), resting on it by previous interposition of a sealing gasket (17). In proximity of the base of the collar (16), a step is provided (16"), which, being made in continuity along the internal perimeter, allows a reduction of the diameter of the cylindrical structure (3), allowing, to annularly realize said interspace (2) in the underlying part. In proximity of the lower edge or base (3"), instead, which is immersed into water (15) let into the container (1), the structure (3), provides a surface (21) where there is a plurality of openings (21') which allow the airflow (f) let into the interspace (2), being this the part immersed into water which makes up together with the lower edge or base (3") the siphon, the passing and the proceeding toward the following dust collection stages.

With the purpose of preventing the migration of the water toward the top of the apparatus (A), both because of the suction process of the airflow (f) and of the stirring, a first deflector suspended device (4) is provided, which is supported by a prominent small edge (5) which overlaps the step (16") of the structure (3) to then vertically continue with the wall (5'), parallel and adjacent to the collar (16). In more detail, the device (4), like the other both metallic and plastic deflectors, is obtained according to a particular funnel-like shape, which for the part of air mixed with water, exceeding the central portion, allows its homogenous distribution along the internal walls (3') of the washing chamber 1-3). This condition, allows the water abatement, that falls on the bottom of the container (1), while a part of the cleaned airflow, laps the converging walls of the deflector (4) to then proceed, together with the central flow (f), toward the suction mouth. For other reasons, the funnel-like shape, involving a reduction of the outflow channel diameter in proximity of the mouth, allows an even distribution of the airflow (f) directed upwardly. Additionally, peripherally to the first deflector (4), there may be associated a sealing gasket, that allows the latter to adhere perfectly to the walls of the collar (16) of the chamber (3).

A second deflector (6), is placed exactly above a first one (4), and has an analogue conic shape. In more detail, said second deflector (6) is overturned with respect to the first one, in order to project the part of wider diameter (6') downwards, while, the circular bottom (6") with a slight central hollow, holds a cup (7) for supporting at least one microfilter or absolute filter (18) provided in correspondence of the suction drawhole (19) of the motor unit (13). Furthermore, in a preferred solution, it can be noticed that in said second deflector (6), the diameter of the conic part (6') is larger than the diameter found in correspondence of the mouth of the first deflector (4). Regarding the microfilter (18), being also known as a filter of the absolute type, it may be housed along the supporting base fixed on the same plane of the motor unit, and held by eventual radial and concentrical means that compress it against said underlying cup (7) which has also the function of defining a channel for the forced outflow of the sucked air (f) toward the rotor for letting it again in the environment.

Finally, there is a third deflector (8) which supports simultaneously the second deflector (6), cup (7), microfilter (18) and intermediate filter (20). This is made up of a conic body essentially bell-like placed, whose base diameter (8') of a first upsidedown funnel-like shaped deflector (8), corresponds roughly to the diameter of the lower opening of said second deflector (4). The height of said conic third deflector (8), additionally allows it to be placed coaxially to the first deflector (4), partially protruding along the same and leaving a considerable perimetrical interspace for the upward outflow of the sucked air (f). Integral with the conic body of said third deflector (8), a perpendicular upright (9) is obtained, tubular, whose length is greater with respect to the height of the single cone third deflector (8). Thus the spacing of said third deflector (8), from the bottom (21) of the container (3), being in suspension is obtained. Regarding the positioning of said third deflector (8), it is centrally provided, on the bottom (21) of the container (3), a male connection (10), that stands perpendicularly, able to be coaxially inserted inside of the tubular upright (9). Further, it is noticed that the upright (9), extends from over the apex of said cone third deflector (8), obtaining with the terminal (9') a male connection, for being housed inside of a female bush (11) obtained centrally and monolithically from the shape of said second deflector (6), as well as allowing simultaneously the support of the latter.

According to this teaching, it has been noticed that it is the same surface of said second deflector (6) that on the exterior allows the supporting of the microfilter (18) by the interposition of a cup-like support (7). The latter, is provided on the interior of an alignment cone (7'), around which the microfilter or absolute filter (18) is housed. The cup (7) realizes peripherally a ring, exceeding the size of the microfilter (18), with the tilted walls (7") externally followed by a protrusive and on level annular edge (7'''), which ends far from the facing wall (5=) as the upper part of said first deflector (4). Between the edge (7''') of the cup (7) and the underlying surface of the body (12) which supports the motor unit (13), an interspace or air outflow channel is obtained (f), in whose inside an intermediate filter (20) is housed. The characteristic of said filter (20), is that it is placed between the underlying air washing chamber (1-3), and the microfilter or absolute filter (18), in such a way to stop not only the dust and dirt generally having a mean size, but also the macrodirt, for many causes not retained in the underlying siphon path of the container (1). The filter (20), in more detail, is of the type obtained in sponge or the like having a completely open cell structure, so that eventuality the filter (20) if necessary may be removed, suitably washed and again let into the apparatus (A). In this case, the material preferably used for the realization of the filter (20), may be Filtren, with variable porosity, consisting of reticulated polyurethane foams based on a polyether polyol.

A peculiarity which both the microfilter (18) and the intermediate filter having a completely open cell structure (20), is that is does not provide separated gaskets, but it provides some suitable integrate surfaces (18') and (20'). In more detail, both filters (18) and (20), had been previously partially put into a bath of PVC-foam type material, concerning a portion of ring-like surface both of the upper and of the lower side and partially the edges. This in conclusion allows to obtain surfaces (18') and (20') with a high degree of water penetration resistance.

What is claimed is:

1. A vacuum cleaner apparatus comprising:
   an upper part defining a support body;
   a suction motor supported in said upper part by said support body, said suction motor being housed in an opening of said support body, said opening being coated with an acoustic insulating material, said upper part having an outflow channel extending to a rotor of said suction motor;
   an annular suction motor filter positioned along said outflow channel;
   a lower part having a forced water siphon path therein, said lower part having an airflow inlet formed therein;

a deflector means positioned in said lower part above said forced water siphon path, said deflector means for deflecting air sucked through said airflow inlet by said suction motor, said lower part comprising:
  a cylindrical body having a perforated cylindrical wall with a water filter extending across a lower portion of said cylindrical body, said cylindrical body having a bottom extending beyond said water filter;
  a water container extending around said cylindrical body, an inner wall of said water container and outer wall of said cylindrical body defining an annular interspace therebetween, said annular interspace providing an airflow pathway therethrough, said water filter positioned above a bottom of said water container, said deflector means comprising:
    a removable first deflector positioned within said cylindrical body above said water filter, said first deflector having a funnel shape;
    an inverted funnel-shaped second deflector positioned above said first deflector, and
    a third deflector positioned under said first deflector and above said water filter, said third deflector having a substantially conical shape coaxial to said first deflector, said third deflector supported by an upright tubular support engaged with an axially aligned male connector extending perpendicular to said bottom of said water container, said second deflector having a cup-shaped air filter support connected thereto and positioned thereabove, said air filter support receiving said annular suction motor filter therein, said annular suction motor filter comprising an inner microfilter ring and an outer sponge filter, said inner microfilter ring and said outer sponge filter being concentric with each other.

2. The apparatus of claim 1, said sponge filter being an open cell sponge material.

3. The apparatus of claim 1, said air filter support having a peripheral ring of greater diameter than said microfilter, said peripheral ring having a flat horizontal surface spaced from an inner wall of said cylindrical body, said sponge filter housed on said flat horizontal surface.

4. The apparatus of claim 1, said air filter support having a cone extending upwardly from a center thereof, said microfilter extending around said cone of said air filter support.

5. The apparatus of claim 1, said first deflector axially supporting said second deflector and said air filter support and said microfilter and said sponge filter.

6. The apparatus of claim 1, said first deflector having a bottom opening of an approximately same diameter as an outermost diameter of said third deflector, said second and third deflectors being coaxial with said first deflector, said upright tubular support being integral with said third deflector, said male connector being a tube extending upwardly from an axially perpendicular to a plane of said water filter, said tubular support extending upwardly beyond an apex of said third deflector, said tubular support defining a male connector affixed within a female connector formed centrally of and integral to said second deflector.

7. The apparatus of claim 1, said sponge filter being of a polyurethane foam based on a polyether polyol.

8. The apparatus of claim 1, said microfilter and said sponge filter defining ring sealing surface on representative top sides thereof.

* * * * *